United States Patent [19]

Barthelemy et al.

[11] 4,225,114

[45] Sep. 30, 1980

[54] BUTTERFLY VALVE WITH IMPROVED SHAFT CONNECTION

[75] Inventors: Paul J. Barthelemy, Sauk Rapids; Dale R. Clausing, Sartell; Albert W. Libke, Royalton; Donald R. Trott, St. Cloud, all of Minn.

[73] Assignee: General Signal Corporation, Stamford, Conn.

[21] Appl. No.: 952,752

[22] Filed: Oct. 19, 1978

[51] Int. Cl.³ .............................................. F16K 1/22
[52] U.S. Cl. ...................................... 251/308; 29/525
[58] Field of Search .................. 251/306, 308; 29/525; 403/282, 359

[56] References Cited

U.S. PATENT DOCUMENTS

| | | | |
|---|---|---|---|
| 1,157,666 | 10/1915 | Bennett | 29/525 |
| 1,779,805 | 10/1930 | Dunwoodie | 403/359 |
| 2,015,430 | 9/1935 | Matthews et al. | 403/359 |
| 2,343,143 | 2/1944 | Gill | 29/525 |
| 2,529,572 | 11/1950 | Raybould | 251/308 |
| 3,074,292 | 1/1963 | Polmon | 29/525 |
| 3,174,212 | 3/1965 | Seltsam | 29/525 |
| 3,210,892 | 10/1965 | Perham | 403/359 |
| 3,260,502 | 7/1966 | Plumer | 251/308 |
| 3,345,033 | 10/1967 | Fawkes | 251/308 |
| 4,176,823 | 12/1979 | Gliatas | 251/308 |

Primary Examiner—William R. Cline
Assistant Examiner—H. Jay Spiegel
Attorney, Agent, or Firm—Jeffrey S. Mednick

[57] ABSTRACT

A butterfly valve is provided having a disc with a hub. The disc is adapted to be rotated between an open and a closed position. A valve seat is adapted to engage the disc in the closed position. A shaft has one end affixed to the hub and extends outwardly therefrom to permit torque to be transmitted to the disc from a point external thereof. The end of the shaft affixed to the hub includes a plurality of splines for securing the shaft to the hub. Each of the splines interfers with the hub by a maximum dimension of 0.030 inches. The hub has a stress that is less than 20,000 pounds per square inch. The shaft is joined to the disc by forming the valve disc with a portion of increased thickness (hub) relative to the main portion of the disc. The portion of increased thickness is formed adjacent the circumference of the disc. A hole is then machined into the portion of increased thickness parallel to the disc, with the hole having a diameter slightly smaller than the diameter of the shaft. Splines are formed on one end of the shaft and the shaft is then pressed into the hole, cutting grooves in the side walls of the hole, thereby forming a permanent connection between the shaft and the disc.

12 Claims, 13 Drawing Figures

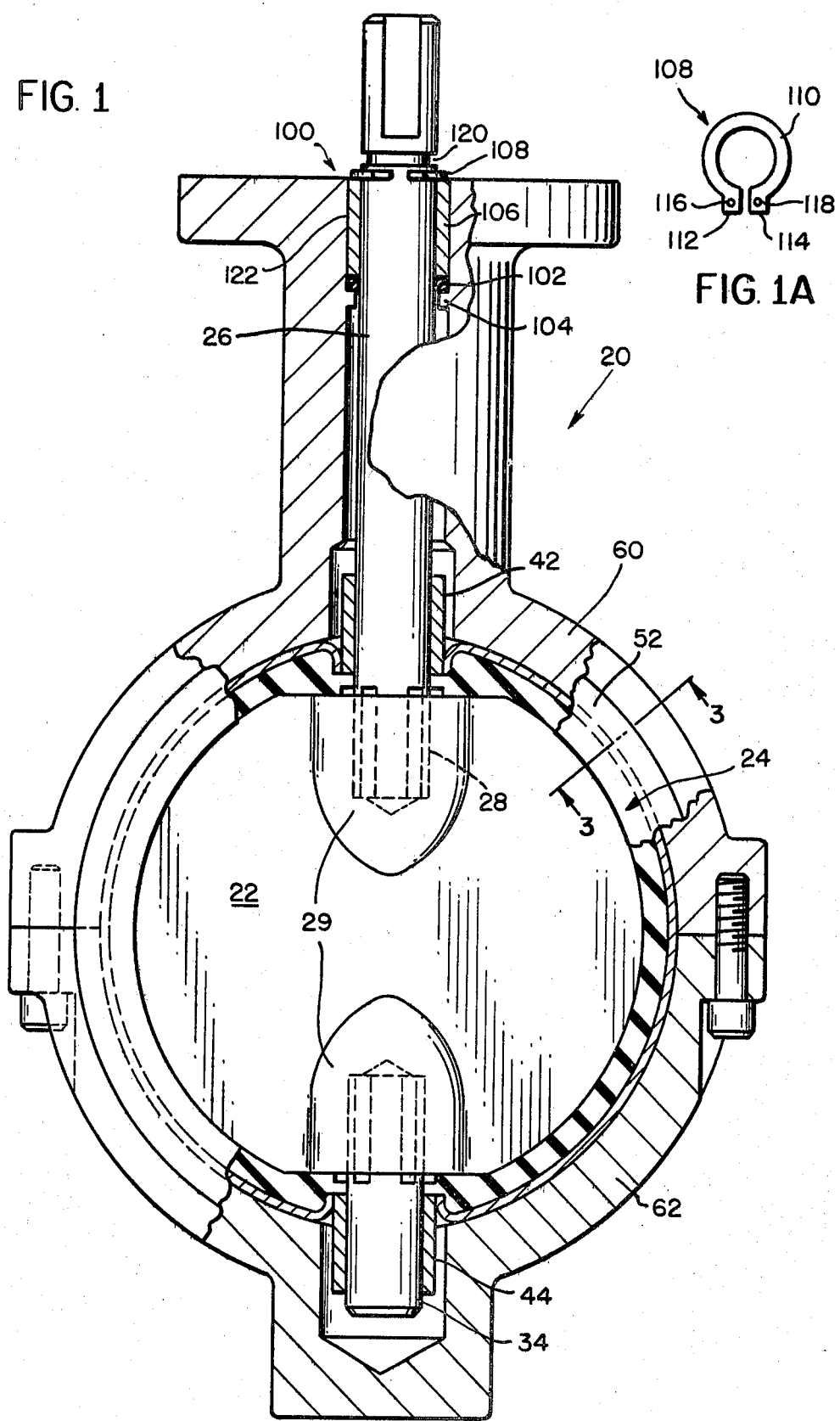

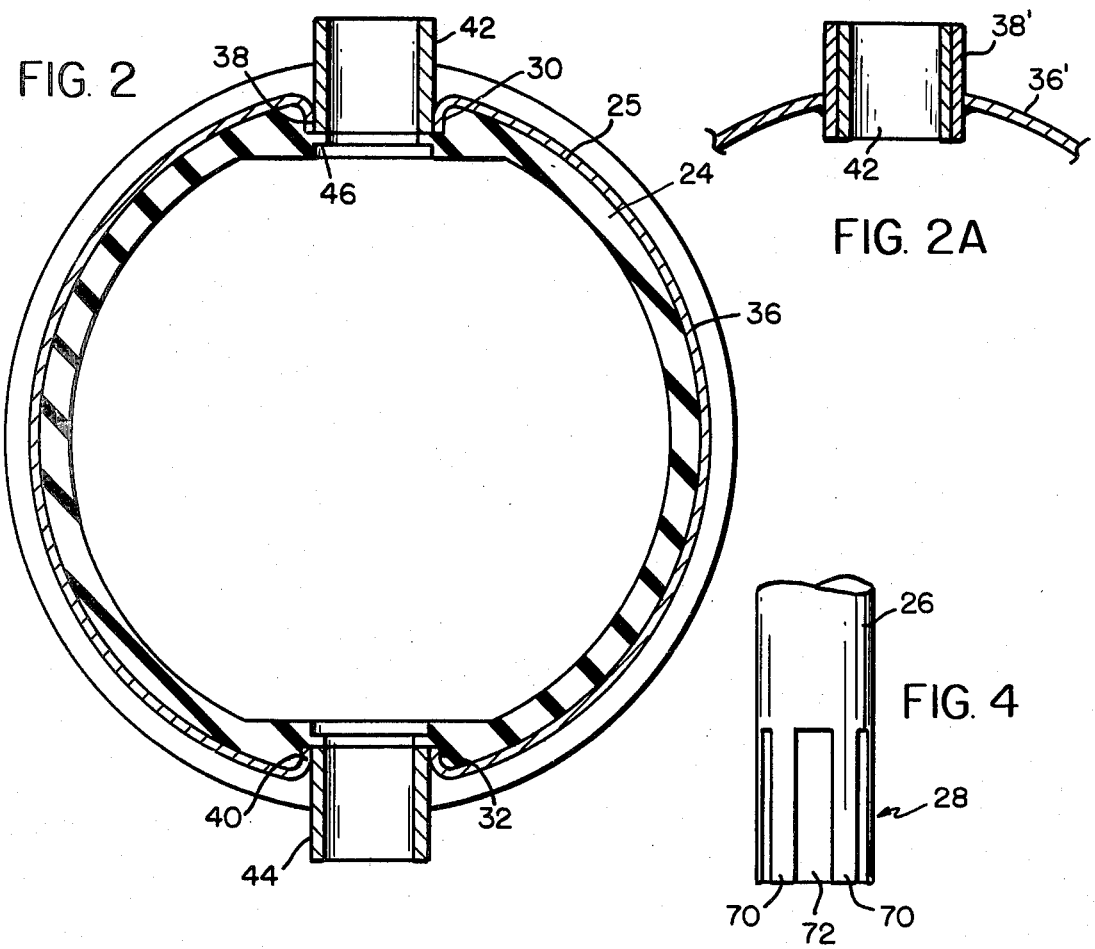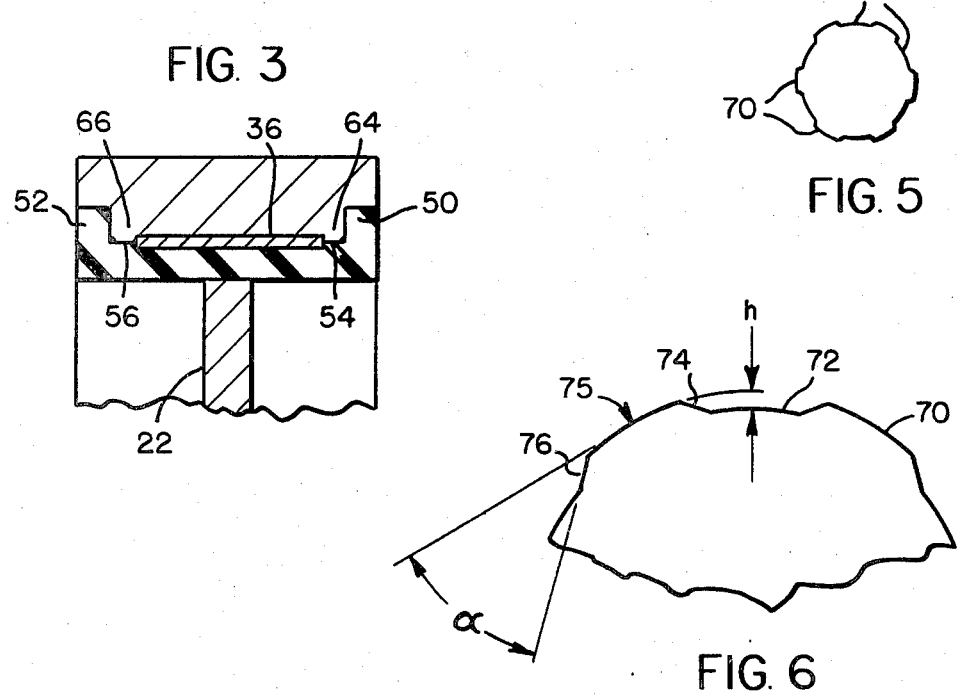

BUTTERFLY VALVE WITH IMPROVED SHAFT CONNECTION

BACKGROUND OF THE INVENTION

The present invention relates generally to butterfly valves and more particularly to a butterfly valve having an improved connection between the valve shaft and the valve disc.

Butterfly valves have historically been provided with one of two general types of connections between the actuator shaft and the valve disc. In one type of connection the disc includes a portion of increased thickness running longitudinally down the center of the disc and the actuator shaft is passed completely through the center of the disc and pivoted for rotation at the top and the bottom of the valve. While such connections have been generally successful, they suffer from the disadvantage of being relatively expensive due to increased material and machining costs and also suffer from the disadvantage that a somewhat increased restriction to flow is presented when the valve is in the open position. A second general type of actuator shaft connection has been generally called a stub shaft connection. In stub shaft butterfly valves the disc includes portions of increased thickness at the top and the bottom of the disc only. The actuator shaft is partially inserted into the disc at the top of the disc and a small shaft is inserted into the bottom of the disc. Such stub shafts have been connected to the disc in a variety of manners. In some instances the shafts have been pinned or bolted to the disc. Another approach has been to use a broached type connection such as a square connection or a hexagonal connection. Such connections have been subject to the disadvantages of leaking, providing protuberances into the flow stream, or looseness of connection resulting in a backlash making it difficult to close the valve tightly, providing poor control with automatic actuators, or even permitting shaft blow out. Another type of connection which is known and which tends to overcome some of the aforementioned difficulties is a knurled or upset interference fit between the shaft and the valve disc. In this type of connection the shaft is provided with projections on the end thereof, which when forced into contact with the hole in the top of the disc tend to radially deform the hole thereby resulting in an interference fit. This type of connection has suffered from the disadvantage that where a good connection has been made, high stresses are created in the valve disc, which is usually cast iron, increasing the possibility of failure of the valve disc. These high stress levels are required because the disc hub stresses must create a high compressive frictional force in order to fully transmit the valve shaft torque in addition to preventing backlash and preventing the shaft from blowing out due to normal or abnormal internal pressures. While the disc hub may be made larger to reduce the stresses, this increases the cost of material. Furthermore, in those instances where the interference fit is not tight enough, valves may fail under pressure by forcing the shaft axially out of the hole, or by the interference connection being inadequate to transmit the required torque from the shaft to the disc.

SUMMARY OF THE INVENTION

Thus a butterfly valve has been provided which has a disc with a hub adapted to be rotated between an open and a closed position and a valve seat adapted to engage the disc in the closed position. A shaft has one end affixed to the hub and extends outwardly therefrom to permit torque to be transmitted to the disc from a point external thereof. The end of the shaft affixed to the disc includes a plurality of splines for securing the shaft to the disc. Each of the splines has a sharp leading edge and interferes with the hub by a maximum dimension of 0.030 inches. The hub has a stress that is less than 20,000 pounds per square inch. The shaft is joined to the disc by forming the valve disc with a portion of increased thickness (hub) relative to the main portion of the disc. The portion of increased thickness is formed adjacent the circumference of the disc. A hole is then machined into the portion of increased thickness parallel to the disc, with the hole having a diameter slightly smaller than the diameter of the shaft. Splines are formed on one end of the shaft and the shaft is then pressed into the hole, cutting grooves in the side walls of the hole, thereby forming a permanent connection between the shaft and the disc.

OBJECTS OF THE INVENTION

An object of the present invention is the provision of a butterfly valve having a stub shaft connection with the valve disc which will not be subject to failure due to the internal pressure of the valve.

Another object of the present invention is the provision of a butterfly valve having an improved stub shaft connection to the disc which eliminates any mechanical backlash between the disc and the shaft.

Yet another object of the present invention is the provision of a butterfly valve having an improved stub shaft to disc connection wherein the torque transmitting capability of the connection exceeds that of the shaft.

Yet another object of the present invention is the provision of a butterfly valve having an improved stub shaft to disc connection which leaves the disc in a condition of low residual stress.

Still another object of the present invention is the provision of a butterfly valve having an improved stub shaft to disc connection which does not create any additional protuberances into the flow stream when the valve is in the open position.

Still another object of the present invention is the provision of a butterfly valve having an improved stub shaft to disc connection that requires low residual hub stress to prevent backlash and shaft blow out but no extra stress is required to transmit shaft to disc torque.

A still further object of the present invention is the provision of a butterfly valve having an improved stub shaft to disc connection which is both simple in construction and inexpensive to manufacture.

Other objects, advantages, and novel features of the present invention will become apparent from the following detailed description of the invention when considered in conjunction with the accompanying drawings.

BRIEF DESCRIPTION OF THE DRAWINGS

FIG. 1 shows a longitudinal cross section view of the butterfly valve of the present invention.

FIG. 1A shows a top view of a retaining ring shown in FIG. 1.

FIG. 2 shows a longitudinal cross section of the valve seat and bearing assembly of the butterfly valve shown in FIG. 1.

FIG. 2A shows a modified end structure on the ring illustrated in FIG. 2.

FIG. 3 shows a partial longitudinal cross-sectional view of the valve seat and valve housing of the butterfly valve shown in FIG. 1.

FIG. 4 shows a plan view of the valve shaft of the butterfly valve shown in FIG. 1.

FIG. 5 shows a front view of the shaft shown in FIG. 4.

FIG. 6 shows an enlarged partial front view of the shaft shown in FIG. 4.

FIG. 7 shows a longitudinal cross-sectional view of the valve disc of the butterfly valve shown in FIG. 1 as the shaft shown in FIG. 4 is being inserted in.

DESCRIPTION OF THE PREFERRED EMBODIMENT

Figure 7:
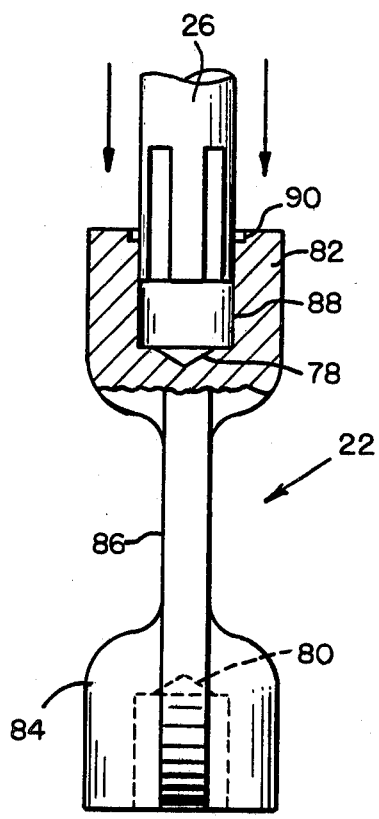

FIG. 1 shows a butterfly valve 20 including a disc 22 adapted to be rotated between an open and a closed position. A valve seat 24 made of resilient material, preferably rubber, surrounds the disc 22 and is adapted to engage the disc when the valve is in the closed position. A shaft 26 has one end 28 affixed to the disc 22 at hub 29 and extends outwardly therefrom. The other end of shaft 26 is connected to an actuator of any desired type (not shown). As is best seen in FIG. 2, the valve seat 24 includes an outer wall 25 having a pair of apertures 30 and 32 therein. The shaft 26 extends through the aperture 30 and a second shaft 34 is affixed to the bottom of disc 22 and extends outwardly therefrom through aperture 32. A ring 36, preferably made of steel, surrounds the outer wall 25 of valve seat 24 and is permanently affixed thereto, preferably by vulcanization, in order to prevent deformation of the outer wall of the valve seat. It is important that the ring 36 be made of a material that is much stronger and much more rigid than the valve seat 24. Preferably, ring 36 should be strong enough to support the rated pressure of the valve, even without the housing. The ring 36 further includes a pair of cylindrical lips 38 and 40, each defining an aperture in the ring. The cylindrical lips 38 and 40 are located snugly within the apertures 30 and 32, respectively. A cylindrical collar 42 surrounds the shaft 26 and is positioned within the cylindrical lip 38 in such a manner that the lip 38 supports the collar 42 and the collar 42 in turn provides a bearing surface for the shaft 26. Likewise, a cylindrical collar 44 surrounds the shaft 34 and is positioned within cylindrical lip 40 in such a manner that the lip 40 supports the collar 44 and the collar 44 in turn provides a bearing surface for the shaft 34.

It is a particularly important feature of the present invention that by inserting the collars 42 and 44 into the valve seat 24, the bearing surfaces provided for the shafts 26 and 34 respectively are positioned as close as possible to the disc 22. This has the greatly beneficial affect of reducing bearing loads by minimizing the moment between the shaft and the bearing. It has the additional beneficial affect of making it easy to align the bearings with the shaft. The collars 42 and 44 are also preferably vulcanized into the valve seat 24 to create a unitary structure with the valve seat 24 and the ring 36.

The upper and lower apertures 30 and 32 in the outer wall of valve seat 24 includes a means for sealing the outward portion of the shaft 24 from the disc 22 whereby fluid is prevented from leaking along the shaft 26. This is accomplished by radially extending flange 46 extending inwardly from the walls of the aperture 30 near the top of the disc 22. The end of the cylindrical lip 38 and the end of the collar 42 abut the top surface of the flange 46, which has an inside diameter that is slightly smaller than the inside diameter of collars 42 and 44. The inner surface of the projection 46 contacts the shaft 26 above spline 70 to effectively seal the shaft 26 from the disc 22, due to radial compression of the elastomeric flange 46.

Referring to FIG. 2A, there is shown a modified ring 36'. In situations where the bearing loads are increased, such as in larger butterfly valves, a cylindrical member 38' may be welded to ring 36'. The member extends radially inwardly and outwardly of ring 36' for added support for collar 42.

As is best seen in FIG. 3 the valve seat 24 includes a pair of flanges 50 and 52 on the axial ends thereof projecting radially outwardly from the outer wall 25. The ring 36 is positioned between the flanges 50 and 52 and spaced therefrom creating a pair of grooves 54 and 56, with one groove being on each side of the ring 36. At this point it should be apparent that the disc 22, the valve seat 24, the shafts 26 and 34, the ring 36, and the collars 42 and 44 form a unitary valve assembly or cartridge.

The butterfly valve 20 further includes a housing having an upper section 60 and a lower section 62. Each of the sections 60 and 62 includes a pair of projections 64 and 66 on the inner surface thereof for mating with the pair of grooves 54 and 56 respectively. The sections 60 and 62 are joined, preferably by bolting, and cooperate with the ring 36 and the outer wall 25 of the valve seat 24 to hold the unitary valve assembly within the housing. Thus, the butterfly valve of the present invention is provided with the important constructional feature of having a complete valve cartridge within the valve housing which may be removed easily for servicing or replacement. Additionally, since this valve cartridge includes a rigid retaining ring which cooperates with the valve housing, the valve may be utilized for dead-end service. This is so since even should the valve be in the closed position and the conduit downstream of the pressure be removed from connection to the valve 20, the valve cartridge of the present invention is sturdy enough to retain rated pressure without being deformed radially, or displaced axially because of the cooperation of ring 36 and projections 64 and 66.

As is shown in FIGS. 4 through 9 the butterfly valve 20 includes an improved connection between the shafts 26 and 34 and the disc 22. For simplicity the connection will be described with regard to shaft 26. The end 28 of shaft 26 which connects with disc 22 includes a plurality of splines 70 for securing the shaft 26 to the disc 22. The height of each of the splines 70 is defined as the space between a plane tangent to the outer surface of the spline 70 and a plane parallel to the aforementioned plane and tangent to the imaginary continuation of the grooves 72 interspersed between splines 70. This is illustrated as "h" in FIG. 6. It is significant that this dimension "h" be no more than 0.030 inches. This figure is derived by adding the maximum interference between the splines and the hub, 0.025 inches, plus approximately 0.005 for tolerances. Should the interference exceed 0.025 inches, the cutting stresses during shaft installation become unacceptable. While a clearance between groove 72 and hole 88 is not required, it is desirable to vent gas that may be trapped in cavity 78. Clearance between bore 88 and the surface 72 provides for venting of air. The interference between the splines and the hub is preferably 0.011 inches and the tolerance is preferably 0.003 inches. The clearance is preferably 0.005 inches. Each of the splines 70 includes a cylindrical top surface portion 75 and two side walls 74 and 76 extending therefrom toward the body of the shaft at an angle with respect to the plane tangent to the top surface portion at the center thereof. This angle, illustrated as $\alpha$ in FIG. 6, is between 30 and 60 degrees and is preferably 45 degrees. The reasons for the above dimensional constraints are that it is important to minimize the amount of material removed from the disc 22 during the process of inserting the shaft 26 while at the same time attaining a strong joint. Additionally, it is important not to place undue stress on the disc 22 during this operation.

Since there will be some removal of material during the insertion of shafts 26 and 34 into disc 22, it is important that the disc 22 be provided internal cavities 78 and 80 for receiving any material removed from the interior of the disc during the process of joining the shafts to the disc. Since the shafts 26 and 34 must cut into the disc 22 it is imperative that these shafts have a hardness greater than the hardness of the disc 22. It has been found that the minimum difference between the hardness of the shaft and the hardness of the disc should be approximately 5 on the Rockwell C scale, with the shaft being the harder material. For example, the shaft may be made out of steel having a Rockwell C hardness greater than 33 and the disc may be made of cast iron having a Rockwell C hardness less than 27. It is also preferable that the length of the splines is approximately one and one-half times the diameter of the shaft and the width of the splines is approximately one-quarter to approximately one-third the diameter of the shaft. For example, a shaft one-half inch in diameter could have six splines, each 0.158 inches wide and three-quarters of an inch long. Thus, the circumference of the shaft will determine the number of splines there are.

Figure 8:
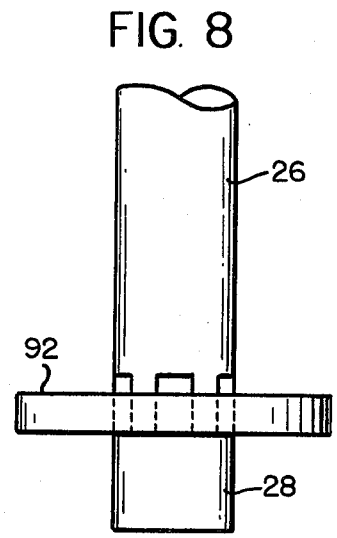
FIGS. 8 and 9 show in schematic form the method of making the valve shaft of the present invention.
Figure 9:
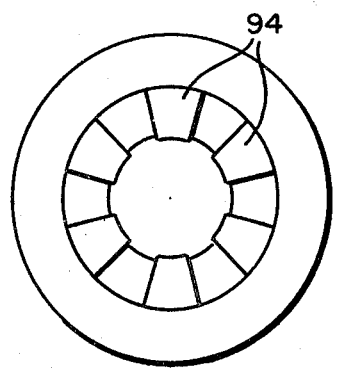

As is most apparent from FIG. 7 the present valve is of the stub shaft type and thus valve disc 22 is formed with hub portions 82 and 84 having increased thickness relative to the main portion 86 of the disc. The portions of increased thickness 82 and 84 are adjacent the circumference of the disc 22. In smaller valve sizes (such as less than approximately three inches) the hubs may run together into one continuous cylindrical surface. The method of joining the shafts to the disc will be described only with respect to shaft 26, it being understood that the same process applies to shaft 34. A hole 88 is drilled in the portion 82 of disc 22. The hole 88 has a diameter which is smaller than the diameter of the shaft 26, but larger than the shaft surface diameter 72 to provide clearance. A slightly larger hole 90 is drilled as a pilot hole to facilitate the insertion of the shaft 26, and to allow for the "start" area of the splines, after the shaft is installed. As is shown in FIGS. 8 and 9 splines are formed on the end 28 of shaft 26 by cutting tool 92. The cutting tool 92 includes a plurality of cutting elements 94 for cutting grooves in the shaft 26. The shaft 26 is then pressed into hole 88, as is illustrated in FIG. 7 thereby utilizing the splines 70 to cut grooves in the side walls of the hole 88 to form a permanent joint between the shaft and the disc. The resultant connection exceeds the torque transmitting capability of the shaft 26 and the strength of the disc 22.

At the other end of shaft 26, there is provided a unique bearing retainer assembly 100. As is best seen in FIG. 1, assembly 100 includes an elastomeric "O" ring 102 compressed radially between shaft 26 and cylindrical bore 122, with bearing 106 and shoulder 104 forming the walls of an "O" ring groove. "O" ring 102 and bearing 106 may be made of any suitable material such as rubber and bronze, respectively. In order to insure that fluid leaking along shaft 26 does not eject bearing 106 and cause personal injury or property damage, a retaining ring 108 is provided, abutting bearing 106. Referring to FIG. 1A, retaining ring 108 includes a split ring portion 110, engaging shaft 26, having ends 112 and 114. Each of ends 112 and 114 includes a hole 116 and 118, respectively. These holes may be used in assembling and disassembling retaining ring 108 on shaft 26. By merely inserting projections into the holes, retaining ring may be opened and closed. The retaining ring may be made of any suitable material, such as carbon spring steel (SAE 1060-1090). The retaining ring exerts a frictional hold against axial displacement. Should fluid pressure become sufficient to eject bearing 106, the frictional grip of retaining ring 108 on shaft 26 will stop axial movement of bearing 106, because the shaft 26 is firmly retained in the valve disc 22 as described earlier.

It may be desirable, as an added precaution, to provide an annular groove 120 in shaft 26 adjacent to retaining ring 108. In this case, even if a sudden high leakage pressure were sufficient to slide retaining ring 108 along shaft 26, retaining ring 108 (being sprung) would seat itself in groove 120 which prevents further axial movement of the retaining ring. The width of the groove should be at least slightly wider than the width of the retaining ring so that the retaining ring will easily fall into the groove. For example, the groove should be at least approximately 0.030 inches wider than the retaining ring.

It is significant that the groove be spaced axially from the retaining ring. Since the groove is formed prior to assembly, it would be difficult to estimate the precise location of the retaining ring. By spacing the groove from the retaining ring the manufacturing process is simplified.

Figure 10:
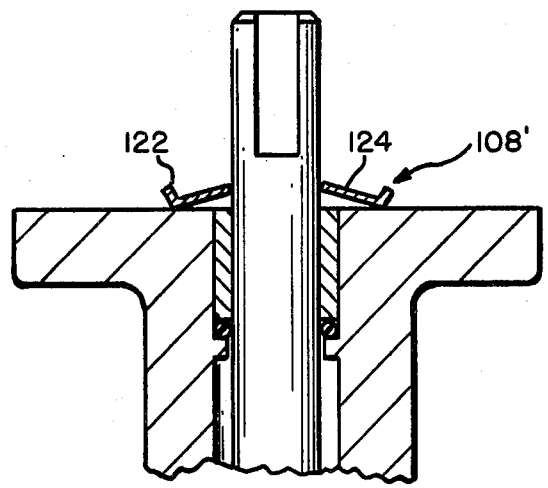
FIG. 10 shows a portion of the butterfly valve including an alternate retaining ring.
Figure 11:
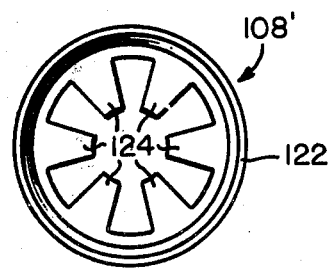
FIG. 11 shows a top view of the retaining ring shown in FIG. 10.

Referring to FIGS. 10 and 11, there is shown a modified retaining ring 108'. In many cases, such as with small butterfly valves, it may be sufficient to use a retaining ring such as the one illustrated in FIGS. 10 and 11. This retaining ring 108' includes a circumferentially extending portion 122 with a plurality of radially extending fingers 124. Retaining ring 108' may be slid over shaft 26 with relative ease since radially extending fingers 124 extend axially away from the direction of travel of the retaining ring as it is installed on shaft 26. Retaining ring 108' may be made of any suitable material, such as carbon spring steel. While it has not been illustrated in FIG. 10, it may be desirable to include an annular groove on shaft 26 similar to the one that is used with respect to retaining ring 108.

Should fluid pressure become sufficient to eject bearing 106, the frictional grip of retaining ring 108' on shaft 26 will be increased by the force of bearing 106 on the back of fingers 124 to stop ejection of bearing 108.

While there has been described what is at present considered to be the preferred embodiment of the present invention, it will be obvious to those skilled in the art that various changes and modifications may be therein, without departing from the invention, and it is, therefore, deemed in the appended claims to cover all such changes and modifications as followed in the true spirit and scope of the invention.

What we claim is:

1. A butterfly valve comprising:
   a disc having a hub and adapted to be rotated between an open and a closed position;
   a valve seat adapted to engage said disc in said closed position; and
   a shaft having one end pressed into a bore of said hub and extending outwardly therefrom to permit torque to be transmitted to said disc from a point external thereof, said one end of said shaft including a plurality of splines for securing said shaft to said hub, each of said splines having a circular outer periphery coaxial with the bore and interfering with said hub by a maximum radial dimension of 0.030 inches greater than the radius of the bore, and said hub having a hoop stress that is less than 20,000 pounds per square inch after the shaft is pressed into the bore of the hub, and each spline having a length approximately one and one-half times the diameter of the shaft and a width from approximately one-quarter to approximately one-third the diameter of the shaft.

2. A butterfly valve as defined in claim 1, wherein said maximum radial dimension is 0.011 inches greater than the radius of the bore.

3. A butterfly valve as defined in claim 1, wherein said hub has a hoop stress of approximately 12,800 pounds per square inch after the shaft is pressed into the bore of the hub.

4. A butterfly valve as defined in claim 1, wherein each of said splines includes a cylindrical top surface portion and two side walls extending therefrom toward the body of said shaft at an angle with respect to the plane tangent to said top surface portion at the center thereof, said angle being between 30 degrees and 60 degrees.

5. A butterfly valve as defined in claim 4, wherein said angle is 45 degrees.

6. A butterfly valve as defined in claim 1, wherein said hub includes a plurality of grooves mating with said splines and having a depth equal to the height of said splines for preventing relative movement between said disc and said shaft.

7. A butterfly valve as defined in claim 1, wherein said disc includes an internal cavity between said one end of said shaft and the center of said disc for receiving any material removed from the interior of said disc during the process of joining said shaft to said disc.

8. A butterfly valve as defined in claim 1, wherein said shaft has a hardness much greater than the hardness of said disc.

9. A butterfly valve as defined in claim 8, wherein the difference between the hardness of the shaft and the hardness of the hub is approximately 5 on the Rockwell C scale.

10. A butterfly valve as defined in claim 8, wherein said shaft is made of hardened steel and said disc is made of cast iron.

11. A butterfly valve as defined in claim 8, wherein said disc is made of a ductile iron.

12. A butterfly valve as defined in claim 1, further including another shaft having one end affixed to said disc in a bore in a second hub and extending outwardly therefrom, said one end of said other shaft including a plurality of splines for securing said other shaft to said disc, each of said splines of the other shaft having a radius height no more than 0.030 inches greater than the radius of the bore of the second shaft.

* * * * *